F. BROWN.
CLOTHES LINE SHEAVE.
APPLICATION FILED DEC. 3, 1913.

1,106,696.

Patented Aug. 11, 1914.

WITNESSES.
K. Christopherson
P. Hill

INVENTOR.
FRANK BROWN.
BY Fetherstonhaugh & Co.
ATT'YS.

UNITED STATES PATENT OFFICE.

FRANK BROWN, OF VANCOUVER, BRITISH COLUMBIA, CANADA, ASSIGNOR TO HENRY MITCHELL BODDY, OF VANCOUVER, BRITISH COLUMBIA, CANADA.

CLOTHES-LINE SHEAVE.

1,106,696.   Specification of Letters Patent.   Patented Aug. 11, 1914.

Application filed December 3, 1913.   Serial No. 804,450.

*To all whom it may concern:*

Be it known that I, FRANK BROWN, a subject of the King of Great Britain, and a resident of the city of Vancouver, in the Province of British Columbia, Canada, have invented certain new and useful Improvements in Clothes-Line Sheaves, of which the following is a specification.

This invention relates to a clothes line sheave, the design and construction of which have been simplified to an extreme limit without sacrificing in any way its efficiency for the work required of it. In a sheave of this class, as at present used, a comparatively expensive construction is adopted in order to provide a freedom of movement of the sheave on its suspending attachment, and provision is also made to prevent the line accidentally getting out of the groove of the sheave. While these devices may be quite satisfactory, unnecessary expense is entailed in the construction. In the sheave which is the subject of this application, all essential requirements are provided for in a simple and direct manner, and the whole framework of the sheave, both in its provision for suspension to its support and in the means by which the line is prevented from getting out of the groove of the sheave, is made from one dimension only of thin flat metal strips.

The invention is particularly described in the following specification, reference being made to the drawings by which it is accompanied, in which—

Figure 1:
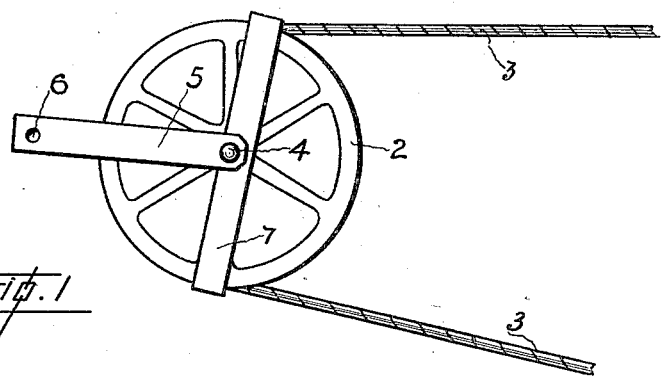
Figure 2:
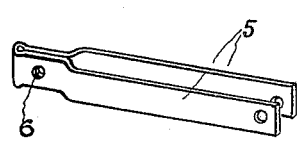
Figure 3:
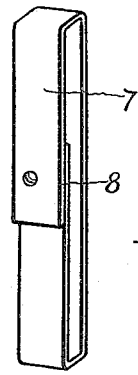

Figure 1 is a side elevation showing the clothes line in the groove of the sheave, in the position as when loaded. Figs. 2 and 3 are detached details of the suspension and guide loops respectively.

In these drawings 2 represents the sheave which is provided with a groove for the retention of the clothes line 3, and 4 is the axle rivet on which the sheave is rotatably mounted in the loop 5 by which the sheave is connected to the support. This loop 5 is constructed of a thin flat strip of metal doubled over the width required to include the thickness of the pulley rim and flattened together at the loop end and provided with an aperture 6 for the reception of the hook by which the sheave is connected to its support. Pivotally mounted on the same axle rivet 4 and susceptible of movement thereon independent of the suspension loop 5 is a guide loop 7 which is formed of the same thin flat metal and is folded over to the required width to receive the sheave 2. The two ends 8 of the loop are brought together adjacent to the axle rivet 4 of the sheave and are secured thereon so that they require no other fastening than what is afforded by the riveting of this pin in the suspension loop 5. This loop is designed to prevent the clothes line 3 getting out of the groove of the sheave, to further which object the hole for the pin 4 is drilled to project the width of the guide loop 7 away from the suspension. By making the suspension loop and the guide loop separate, and mounting them in the manner described on the axle pin so as to be independently movable thereon, they can be very cheaply made, as requiring a minimum of fitting or hand work, and the sheave is as effective as when more elaborately and expensively made.

What I claim as my invention is:—

1. A clothes line sheave, comprising the combination with a grooved sheave, of a suspension loop made of a thin flat metal strip bent and drilled to receive the opposite ends of the axle rivet, the sides of said strip outside the radius of the sheave being flattened together and perforated for attachment to the external support, and a guide loop formed of the same flat thin material and bent around the thickness of the sheave at its diameter, the ends of the strip terminating approximate to the axial center of the sheave and drilled to receive the axle rivet which also secures the ends of the strip, as and for the purpose specified.

2. A clothes line sheave, comprising the combination with a grooved sheave, of a suspension loop made of a thin flat metal strip bent and drilled to receive the opposite ends of the axle rivet, the sides of said strip outside the radius of the sheave being flattened together and perforated for attachment to the external support, and a guide loop formed of the same thin flat material and bent around the thickness of the sheave at its diameter, the ends of the strip terminating approximate to the axial center of the sheave and drilled to receive the axle rivet which also secures the ends of the strip, the drilled hole for the axle rivet being toward the edge of the strip nearer to the place of suspension, as and for the purpose specified.

Dated at Vancouver, B. C., this 26th day of November, 1913.

FRANK BROWN.

Witnesses:
JAMES TAYLOR,
FREDERICK GEORGE TANNER LUCAS.